United States Patent
Boni et al.

(10) Patent No.: US 12,510,749 B2
(45) Date of Patent: Dec. 30, 2025

(54) BIAXIAL MICROELECTROMECHANICAL MIRROR DEVICE WITH PIEZOELECTRIC ACTUATION

(71) Applicant: STMicroelectronics S.r.l., Agrate Brianza (IT)

(72) Inventors: Nicolo' Boni, Mountain View, CA (US); Roberto Carminati, Piancogno (IT); Massimiliano Merli, Pavia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 354 days.

(21) Appl. No.: 18/118,333

(22) Filed: Mar. 7, 2023

(65) Prior Publication Data

US 2023/0288696 A1  Sep. 14, 2023

(30) Foreign Application Priority Data

Mar. 11, 2022  (IT) .......... 102022000004745

(51) Int. Cl.
*G02B 26/08* (2006.01)
*B81B 3/00* (2006.01)
*G03B 21/00* (2006.01)

(52) U.S. Cl.
CPC ........ *G02B 26/0858* (2013.01); *B81B 3/0062* (2013.01); *G03B 21/008* (2013.01); *B81B 2201/042* (2013.01)

(58) Field of Classification Search
CPC .............. G02B 26/0858; G02B 26/101; G02B 26/105; B81B 3/0062; B81B 2201/042; G03B 21/008
See application file for complete search history.

(56) References Cited

U.S. PATENT DOCUMENTS

2017/0269352 A1* 9/2017 Hashiguchi ........ G02B 26/0858
2018/0180873 A1 6/2018 Carminati et al.
(Continued)

FOREIGN PATENT DOCUMENTS

CN   107203037 A   9/2017
CN   111320129 A   6/2020
(Continued)

OTHER PUBLICATIONS

IT Search Report and Written Opinion for priority application, IT Appl. 102022000004745, report dated Oct. 28, 2022, 11 pgs.
(Continued)

*Primary Examiner* — Euncha P Cherry
(74) *Attorney, Agent, or Firm* — Crowe & Dunlevy LLC (57) ABSTRACT

A microelectromechanical-mirror device has a fixed structure defining an external frame delimiting a cavity, an internal frame arranged above the cavity and defining a window, and a tiltable structure with a reflective surface and arranged in the window. Elastically coupled to the internal frame by first and second coupling elastic elements. An actuation structure is coupled to the internal frame to cause the rotation of the tiltable structure around first and second axes. The actuation structure has a first pair of driving arms, elastically coupled to the internal frame and carrying piezoelectric material regions to cause rotation of the tiltable structure around the first axis, and a further pair of driving arms carrying piezoelectric material regions to cause rotation of the tiltable structure around the second axis and interposed between the fixed structure and the internal frame, to which they are elastically coupled by first and second suspension elastic elements.

20 Claims, 5 Drawing Sheets

(56) References Cited

U.S. PATENT DOCUMENTS

2019/0265462 A1 8/2019 Yamada
2020/0057298 A1 2/2020 Boni et al.
2020/0192199 A1* 6/2020 Boni ................. G02B 26/0858

FOREIGN PATENT DOCUMENTS

CN 111717884 A 9/2020
CN 220467578 U 2/2024
EP 3264155 A1 1/2018

OTHER PUBLICATIONS

CN First Office Action and Search Report for counterpart CN Appl. No. 202310226307.2, report dated Oct. 17, 2025, 8 pgs.

\* cited by examiner

BIAXIAL MICROELECTROMECHANICAL MIRROR DEVICE WITH PIEZOELECTRIC ACTUATION

PRIORITY CLAIM

This application claims the priority benefit of Italian Application for Patent No. 102022000004745 filed on Mar. 11, 2022, the content of which is hereby incorporated by reference in its entirety to the maximum extent allowable by law.

TECHNICAL FIELD

The present solution relates to a biaxial microelectromechanical mirror device (made as a MEMS—Micro-Electro-Mechanical System) having piezoelectric actuation.

BACKGROUND

Microelectromechanical mirror devices are used in portable apparatuses, such as for example smartphones, tablets, notebooks, PDAs, for optical applications, in particular to direct light radiation beams generated by a light source (for example a laser) in a desired manner. Owing to their small dimensions, these devices allow stringent requirements regarding space occupation to be complied with, in terms of both area and thickness.

For example, microelectromechanical mirror devices are used in miniaturized projector apparatuses (so-called pico-projectors) capable of projecting images from a distance and generating desired light patterns, in particular, on a screen or on a similar display surface.

Microelectromechanical mirror devices generally include a tiltable structure carrying a reflective or mirror surface of a suitable material (for example aluminum, or gold, depending on whether the light beams are in the visible or in the infrared spectrum), elastically supported above a cavity and made from a body of semiconductor material so as to be movable, for example with an inclination or rotation movement outside a corresponding main extension plane, to direct an impinging light beam in a desired manner.

The rotation of the tiltable structure is controlled through an actuation system which may be, for example, of an electrostatic, electromagnetic or piezoelectric type.

Electrostatic actuation systems generally have the disadvantage of requiring high operating voltages, while electromagnetic actuation systems generally entail high power consumption; it has therefore been proposed to control movement of the mirror tiltable structure with a piezoelectric actuation.

Microelectromechanical mirror devices with piezoelectric actuation have the advantage of requiring reduced actuation voltages and power consumption with respect to devices with electrostatic or electromagnetic actuation. Moreover, piezoresistive sensor elements may be provided for detecting the driving condition of the mirror and supplying a feedback signal to allow for feedback control of the same driving.

Typically, a deflection of the light beam along two axes is required, which may be provided by two microelectromechanical mirror devices of a uniaxial type, or by a single microelectromechanical mirror device of a biaxial type.

In case of biaxial device, the tiltable structure may be configured to rotate around a first axis with resonant movement to generate a fast horizontal scan on the screen or display surface, and also around a second horizontal axis with a linear or quasi-static movement (i.e. at a frequency much lower than the frequency of the resonant movement) to generate a slow vertical scan, such as a sawtooth scan on the same screen or display surface. Alternatively, the rotation around the second rotation axis may also occur at the resonance frequency to generate a fast scan in this case vertical, and as a whole forming a so-called "Lissajous" scanning pattern on the screen or display surface.

In general, biaxial microelectromechanical mirror devices may be preferable as they allow a reduction of the dimensions and a simplification of the electrical connections.

However, these biaxial devices may be affected by undesired couplings between the scanning movements around the two axes (so-called cross-axis coupling or, in general, crosstalk phenomena) and by a resulting non-linearity; in the micromechanical structure, in fact, undesired couplings may be generated between the rotation movements of the mirror tiltable structure around the first and the second horizontal axes.

These cross-axis coupling may also occur in the detection (for example for the purpose of a feedback control) of the rotations of the mirror tiltable structure, for example by piezoresistive or piezoelectric detection elements.

Some examples of microelectromechanical mirror devices of a biaxial type and with piezoelectric actuation are described in U.S. Pat. No. 9,843,779 and European Patent No. 3,712,676, the contents of both of which are incorporated by reference in their entireties.

It has found that known solutions of microelectromechanical mirror devices with piezoelectric actuation have some limitations which do not allow full exploitation of the advantages of those devices, in particular due to the aforementioned cross-axis coupling aspects in the actuation movements of the mirror tiltable structure and/or in the detection of the same movements.

To address these issues, further development is needed to provide a biaxial microelectromechanical mirror device with actuation of a piezoelectric type having improved characteristics.

SUMMARY

According to the present solution, a biaxial microelectromechanical mirror device is provided.

For example, disclosed herein is a device including a microelectromechanical mirror device. The microelectromechanical mirror device includes: a fixed structure defining an external frame which internally delimits a cavity; an internal frame, arranged in the cavity and internally defining a window; a tiltable structure carrying a reflective surface having a main extension in a horizontal plane, arranged inside the window and elastically coupled to the internal frame by first and second coupling elastic elements; and an actuation structure, coupled to the internal frame and configured to cause rotation, in a decoupled manner, of the tiltable structure around a first rotation axis and around a second rotation axis orthogonal to each other and belonging to the horizontal plane.

The actuation structure includes: at least a first pair of driving arms elastically coupled to the internal frame and carrying respective piezoelectric material regions biased to cause a rotation of the tiltable structure around the first rotation axis; and a further pair of driving arms carrying respective piezoelectric material regions biased to cause a rotation of the tiltable structure around the second rotation axis, the driving arms of the further pair of driving arms being interposed between the fixed structure and the internal frame, to which they are elastically coupled by first and second suspension elastic elements yielding to torsion around the first rotation axis.

The first and second coupling elastic elements may be yielding to torsion around the second rotation axis and have a linear extension along the second rotation axis, on opposite sides with respect to the tiltable structure, from the tiltable structure up to a respective side of the internal frame.

The fixed structure may include first and second supporting elements, extending along the first rotation axis inside the cavity from the external frame, on opposite sides of the tiltable structure. The driving arms of the further pair may extend between the first and second suspension elastic elements and, respectively, the first and second supporting elements.

The first and second suspension elastic elements may have a first thickness along a vertical axis orthogonal to the horizontal plane. The first and second coupling elastic elements may have a second thickness, along the vertical axis, greater than the first thickness.

The fixed structure may be provided in a die of semiconductor material comprising an upper layer and a bottom layer of semiconductor material, superimposed on each other. The first thickness may be defined by the upper layer and the second thickness may be defined by the bottom layer.

The first thickness may be between 10 µm and 50 µm and the second thickness may be between 50 µm and 200 µm.

The driving arms of the first pair may be elastically coupled to the internal frame through first and second elastic elements extending parallel to, and on opposite sides of, the first rotation axis and yielding with respect to torsion around a rotation axis parallel to the first rotation axis. The driving arms of the first pair, the driving arms of the further pair and the first and second elastic elements may have the first thickness.

The internal frame may have short sides coupled to the tiltable structure through the first and second coupling elastic elements and long sides coupled to the driving arms of the further pair through the first and second suspension elastic elements. The external frame, the tiltable structure and the long sides of the internal frame may have a third thickness equal to a sum of the first thickness and second thickness and the short sides of the internal frame may have the second thickness.

The tiltable structure may be configured to rotate around the first rotation axis with a quasi-static movement and to rotate around the second rotation axis with a resonant movement.

First and second detection elements may be configured to provide detection signals indicative of the rotation of the tiltable structure around the first rotation axis and, respectively, around the second rotation axis, in a decoupled manner. The first detection elements may be coupled to the driving arms of the first pair for detecting the rotations of the tiltable structure around the first rotation axis and the second detection elements may be coupled to the driving arms of the further pair for detecting the rotations of the tiltable structure around the second rotation axis.

The first and second detection elements may include respective diffused piezoresistors or respective piezoelectric sensors, arranged at the respective driving arms.

Each of the first and second detection elements may include a respective mechanical amplification structure, having a lever mechanism, coupled to a corresponding driving arm. The lever mechanism may include a lever arm having longitudinal extension and a first end coupled to a corresponding driving arm by a rigid connecting element and a second end coupled, by a torsional elastic element to an anchoring element, integral with the fixed structure, with a pair of diffused piezoresistors being provided in the torsional elastic element in proximity to the anchoring element.

The diffused piezoresistors of each mechanical amplification structure may form a first half of a respective detection Wheatstone bridge, a second half of which is formed by the respective diffused piezoresistors of the mechanical amplification structure coupled to the driving arm arranged symmetrically with respect to the first rotation axis, or to the second rotation axis.

A second pair of driving arms may be arranged symmetrically to the first pair of driving arms with respect to the second rotation axis. The driving arms of the second pair may carry respective piezoelectric material regions and may be elastically coupled to the tiltable structure on opposite sides and in proximity to the first rotation axis, by respective elastic elements, yielding to torsion around the first rotation axis.

The device may be a pico-projector apparatus including: the microelectromechanical mirror device; a light source configured to generate a light beam that impinges upon the microelectromechanical mirror device; a first driving circuit configured to provide first driving signals to the light source to cause the generation of the light beam by the light source as a function of an image to be projected; and a second driving circuit configured to provide second driving signals to the microelectromechanical mirror device to cause movement of the microelectromechanical mirror device to thereby scan the light beam in a scanning pattern.

BRIEF DESCRIPTION OF THE CLAIMS

For a better understanding, embodiments are now described, purely by way of non-limiting example, with reference to the attached drawings, wherein.

DETAILED DESCRIPTION

Figure 1:
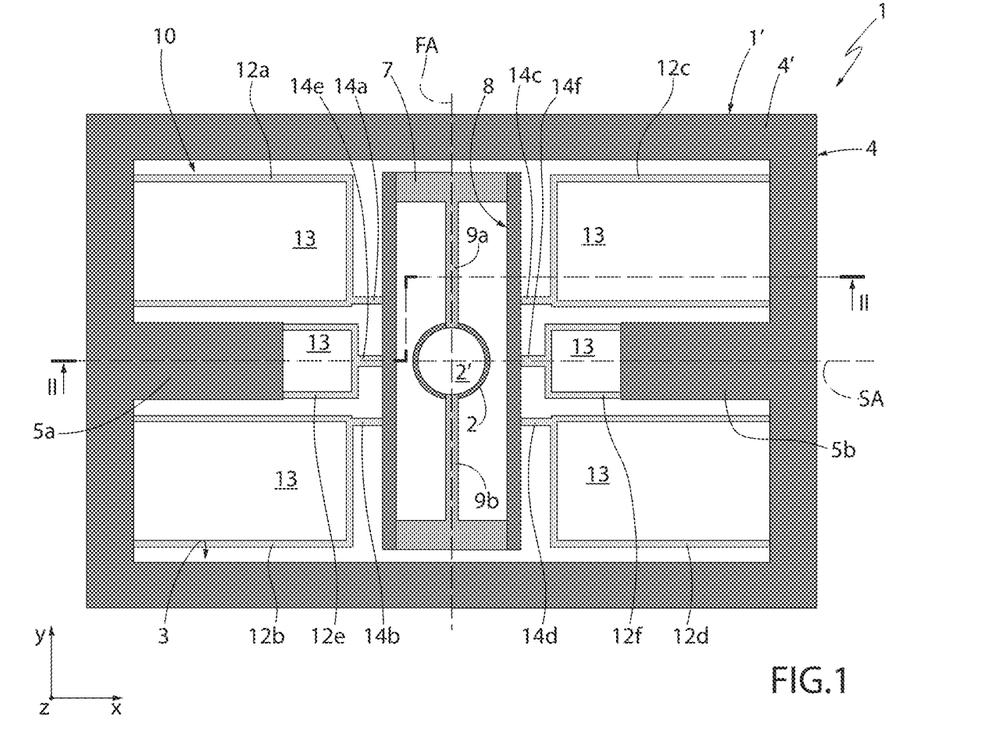
FIG. 1 shows a schematic plan view of a microelectromechanical mirror device, according to an embodiment of the present solution.

FIG. 1 schematically shows a microelectromechanical mirror device of a biaxial type, made using MEMS technology, indicated in general with 1.

The microelectromechanical mirror device 1 is formed in a die 1' of semiconductor material, in particular silicon, and is provided with a tiltable structure 2 having a main extension (for example with a circular or elliptical shape) in a horizontal plane xy and arranged to rotate around a first rotation axis, parallel to a first horizontal axis x of the aforementioned horizontal plane xy and around a second rotation axis, parallel to a second horizontal axis y of the same horizontal plane xy.

In one embodiment, the aforementioned first rotation axis is a slow rotation axis (Slow Axis—SA), with quasi-static rotation, while the aforementioned second rotation axis is a fast rotation axis (Fast Axis—FA), at the resonance frequency. The aforementioned first and second rotation axes, indicated here with SA, FA, also represent first and second median axes of symmetry for the microelectromechanical mirror device 1.

The tiltable structure 2 is suspended above a cavity 3, provided in the die 1' and defining a carrying structure, which carries a reflective mirror surface 2' facing upwardly.

The tiltable structure 2 is elastically coupled to a fixed structure 4, defined in the die 1'. In particular, the fixed structure 4 forms, in the horizontal plane xy, an external frame 4' which delimits and surrounds the aforementioned cavity 3 and also has first and second supporting (or anchoring) elements 5a, 5b, extending longitudinally along the first rotation axis SA inside the cavity 3 from the same external frame 4', on opposite sides of the tiltable structure 2.

The microelectromechanical mirror device 1 further comprises an internal frame 7, having a main extension in the horizontal plane xy, in the example elongated along the second horizontal axis y; in the illustrated embodiment, this internal frame 7 has a generically rectangular shape, with short sides arranged along the first horizontal axis x and long sides arranged along the second horizontal axis y.

The internal frame 7 internally defines a window 8; the tiltable structure 2 is arranged inside this window 8 and is elastically coupled to the internal frame 7 by first and second coupling elastic elements 9a, 9b, yielding to torsion around the second rotation axis FA.

In the illustrated embodiment, the first and the second coupling elastic elements 9a, 9b have a linear extension along the second rotation axis FA, on opposite sides with respect to the tiltable structure 2, from the same tiltable structure 2 up to a respective short side of the internal frame 7.

As will be discussed below, the internal frame 7 is coupled to the aforementioned first and second supporting elements 5a, 5b, so as to be suspended inside the cavity 3.

The microelectromechanical mirror device 1 further comprises an actuation structure 10, coupled to the tiltable structure 2 and configured to cause its rotation around the first rotation axis SA and around the second rotation axis FA, in a substantially decoupled manner.

The actuation structure 10 is generally interposed between the internal frame 7 and the external frame 4' of the fixed structure 4 and also contributes supporting the same internal frame 7 inside the cavity 3.

This actuation structure 10 comprises a first pair of driving arms formed by first and second driving arms 12a, 12b, arranged on the opposite side of, and symmetrically with respect to, the first rotation axis SA and the first supporting element 5a, and having a longitudinal extension parallel to the first horizontal axis x and to the aforementioned first supporting element 5a.

In the embodiment illustrated in FIG. 1, the driving arms 12a, 12b of the first pair have a generically rectangular shape, with a greater extension along the first horizontal axis x.

The first and the second driving arms 12a, 12b have a respective first end integrally coupled to the external frame 4' of the fixed structure 4 and a respective second end elastically coupled to the internal frame 7, by first and second elastic elements 14a, 14b.

Each driving arm 12a, 12b is suspended above the cavity 3 and carries, at a top surface thereof (opposite to the same cavity 3) a respective piezoelectric structure 13 (in particular, including PZT—Lead Zirconate Titanate), having for example substantially the same extension in the horizontal plane xy with respect to the driving arm 12a, 12b.

This piezoelectric structure 13 (in a manner not illustrated in detail) is formed by superimposing: a bottom electrode region, of a suitable conductive material, arranged on the corresponding driving arm 12a, 12b; a piezoelectric material region (for example made by a PZT thin film) arranged on the aforementioned bottom electrode region; and a top electrode region arranged on the piezoelectric material region.

The aforementioned first and second elastic elements 14a, 14b have a high stiffness with respect to movements outside the horizontal plane xy (along the orthogonal axis z) and are yielding with respect to torsion (around a rotation axis parallel to the first rotation axis SA). The first and the second elastic elements 14a, 14b extend parallel to the first horizontal axis x, between the first and second driving arms 12a, 12b and a same long side of the internal frame 7, in proximity to the first rotation axis SA, at a small distance from the same first rotation axis SA.

In the embodiment illustrated in FIG. 1, the first and second elastic elements 14a, 14b are of a linear type having a longitudinal extension parallel to the first horizontal axis x (in a different embodiment, the elastic elements 14a, 14b may alternatively be of a folded type).

The aforementioned actuation structure 10 further comprises a second pair of driving arms formed by third and fourth driving arms 12c, 12d, arranged on the opposite side with respect to the first rotation axis SA and, this time, to the second supporting element 5b and having a longitudinal extension parallel to the first horizontal axis x and to the aforementioned second supporting element 5b (note that the second pair of driving arms 12c, 12d is therefore arranged symmetrically to the first pair of driving arms 12a, 12b with respect to the second rotation axis FA).

Similarly to what has been discussed for the first pair of driving arms 12a, 12b, each driving arm 12c, 12d of the second pair carries, at a top surface thereof, a respective piezoelectric structure 13 (including PZT) and has a respective first end integrally coupled to the external frame 4' of the fixed structure 4 and a respective second end elastically coupled to the internal frame 7, by a respective third and fourth elastic elements 14c, 14d.

The aforementioned third and fourth elastic elements 14c, 14d also have a high stiffness with respect to movements outside the horizontal plane xy (along the orthogonal axis z) and are yielding with respect to torsion (around a rotation axis parallel to the first horizontal axis x). Moreover, the third and the fourth elastic elements 14c, 14d are also, in the example, of a linear type.

As will also be discussed below, the first and the second pairs of driving arms 12a-12b and 12c-12d are operable to cause rotation of the tiltable structure 2 around the first rotation axis SA, in this case with a quasi-static movement.

According to an aspect of the present solution, the actuation structure 10 further comprises a further (third) pair of driving arms formed by fifth and sixth driving arms 12e, 12f, operable to cause rotation of the tiltable structure 2 around the second rotation axis FA, with a resonant movement.

These fifth and sixth driving arms 12e, 12f are interposed between the first and second supporting elements 5a, 5b and the internal frame 7, to which they are elastically coupled by first and second suspension elastic elements 14e, 14f, having a high stiffness with respect to movements outside the horizontal plane xy (along the orthogonal axis z) and yielding with respect to torsion around the first rotation axis SA.

In the illustrated embodiment, the fifth and the sixth driving arms 12e, 12f have a generically rectangular shape, with a greater extension along the first horizontal axis x.

The aforementioned fifth and sixth driving arms 12e, 12f have a respective first end integrally coupled to the first and second supporting elements 5a, 5b (of which they are an extension) and a respective second end elastically coupled to the internal frame 7, through the first and second suspension elastic elements 14e, 14f.

In particular, the first and second suspension elastic elements 14e, 14f extend along the first rotation axis SA, between the second end of the aforementioned fifth and sixth driving arms 12e, 12f and a respective long side of the internal frame 7, to which they are coupled at a corresponding central portion.

In the illustrated embodiment, the first and second suspension elastic elements 14e, 14f are of a linear type (alternatively, they may be of a folded type).

Similarly to what has been discussed for the first and second pairs of driving arms, each driving arm 12e, 12f of the third pair carries, at a top surface thereof, a respective piezoelectric structure 13.

In a manner not illustrated, the microelectromechanical mirror device 1 also comprises a plurality of pads, carried by the fixed structure 4 at the external frame 4', electrically connected to the piezoelectric structures 13 of the driving arms 12a-12f by electrical connection tracks, to allow electrical biasing thereof by electrical signals from the outside of the same electromechanical device 1 (for example provided by a biasing device of an electronic apparatus wherein the microelectromechanical mirror device 1 is integrated).

Figure 2:
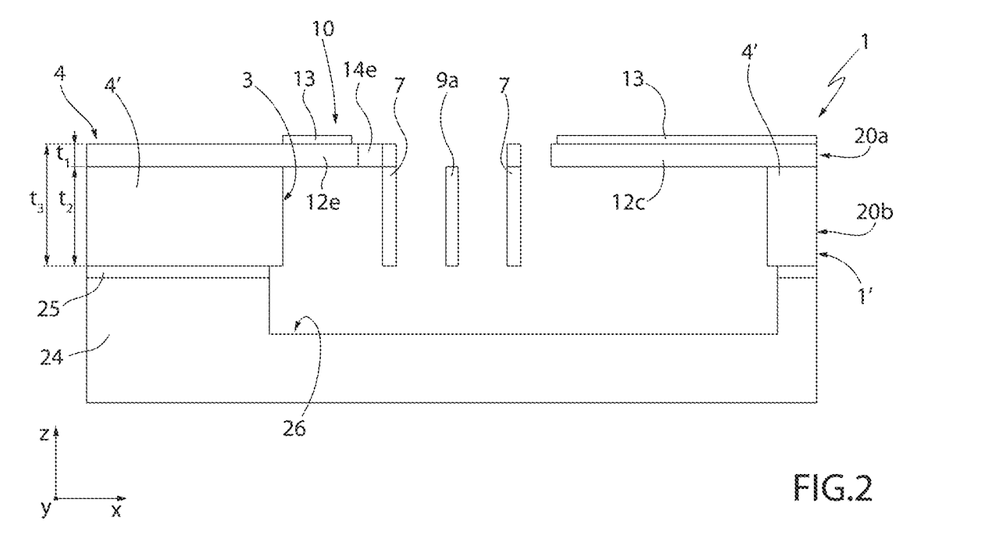
FIG. 2 shows a schematic cross-section of the device of FIG. 1, taken along section line II-II of the same FIG. 1.

As illustrated in the cross-section of FIG. 2, a particular aspect of the present solution envisages the structural elements of the microelectromechanical mirror device 1 being made in three different thicknesses (considered along the vertical axis z), exploiting two different layers of which the die 1' is made, in particular: a top layer 20a, having a first thickness $t_1$ and defining the top surface of the die, at which the aforementioned reflective surface 2' carried by the tiltable structure 2 and the aforementioned piezoelectric structures 13 are provided; and a bottom layer 20b, having a second thickness $t_2$, much greater (even up to ten times greater) than the first thickness $t_1$, arranged below the top layer 20a and defining a back surface of the die 1'.

In the microelectromechanical mirror device 1, therefore, the aforementioned first and second thicknesses $t_1$, $t_2$ and also a third thickness $t_3$, equal to the sum of the same first and second thicknesses $t_1$, $t_2$ are defined.

In a possible embodiment of the microelectromechanical mirror device 1, the first thickness $t_1$ is comprised between 10 μm and 50 μm, for example equal to 30 μm; the second thickness $t_2$ is comprised between 50 μm and 200 μm, for example equal to 110 μm; and the third thickness is for example equal to 140 μm.

In detail, the external frame 4', the first and the second supporting elements 5a, 5b, at least part of the internal frame 7 (in the example, the corresponding long sides) and also the tiltable structure 2 have the third thickness $t_3$, being therefore provided in both the top and bottom layers 20a, 20b; the driving arms 12a-12f of the first, second and third pairs, the corresponding elastic elements 14a-14d and the suspension elastic elements 14e-14f have the first thickness $t_1$, being therefore provided in the sole top layer 20a; and the first and second coupling elastic elements 9a, 9b and the remaining part of the internal frame 7 (in the example the corresponding short sides) have the second thickness $t_2$, thus being provided in the sole bottom layer 20b.

Manufacturing of the elastic elements 14a-14f with the first thickness $t_1$ is particularly advantageous, for the implementation of the quasi-static rotation of the tiltable structure 2; conversely, manufacturing of the first and second coupling elastic elements 9a, 9b with the second thickness $t_2$ allows implementing the resonant rotation of the same tiltable structure 2 at a high frequency, while reducing possible reliability problems (related for example to the superposition of two different layers of material).

As shown in the same FIG. 2, a supporting wafer (or cap) 24 is also coupled below the die 1', by a suitable bonding region 25, and has, below the cavity 3 and at the tiltable structure 2, a recess 26, to allow the rotation of the same tiltable structure 2.

Figure 3:
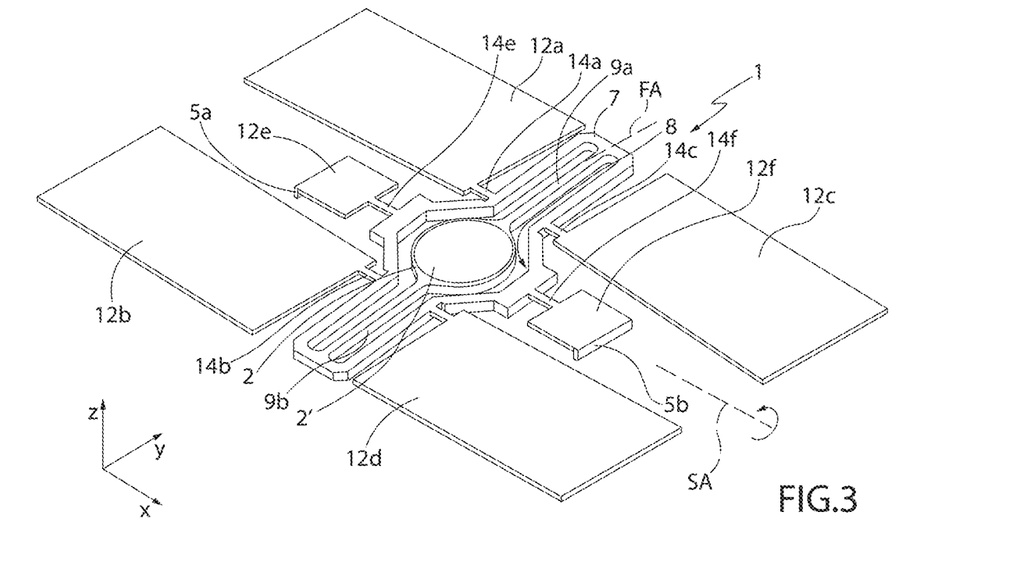
FIGS. 3 and 4 are schematic perspective plan views of the device of FIG. 1, in different operating conditions.

As illustrated in FIG. 3, during the operation of the microelectromechanical mirror device 1, application of a biasing voltage to the piezoelectric structure 13 of the first (and third) driving arm 12a (12c), having a positive value with respect to the bias of the piezoelectric structure 13 of the second (and fourth) driving arm 12b (12d), which may for example be a ground reference potential, causes a rotation of the internal frame 7 and of the coupled tiltable structure 2 by a positive angle around the first rotation axis SA (with resulting torsional deformation of the suspension elastic elements 14e, 14f).

Correspondingly, the application of a biasing voltage to the piezoelectric structure 13 of the second (and fourth) driving arm 12b (12d), having a positive value with respect to the bias of the piezoelectric structure 13 of the first (and third) driving arm 12a (12c), causes a corresponding rotation of the internal frame 7 and of the coupled tiltable structure 2 by a negative angle around the same first rotation axis SA.

During rotation around the first rotation axis SA, the tiltable structure 2 is integrally coupled to the internal frame 7 (due to the rigidity of the coupling elastic elements 9a, 9b with respect to this movement), so as to be dragged in the same rotation and cause the desired movement of the reflective surface 2' with respect to the first rotation axis SA. In other words, the coupling elastic elements 9a, 9b are not subject to deformations due to rotation of the internal frame 7 around the first rotation axis SA.

During this rotation of the tiltable structure 2 around the first rotation axis SA, the maximum amount of stress occurs at the suspension elastic elements 14e, 14f, which couple the internal frame 7 to the fixed structure 4.

Figure 4:
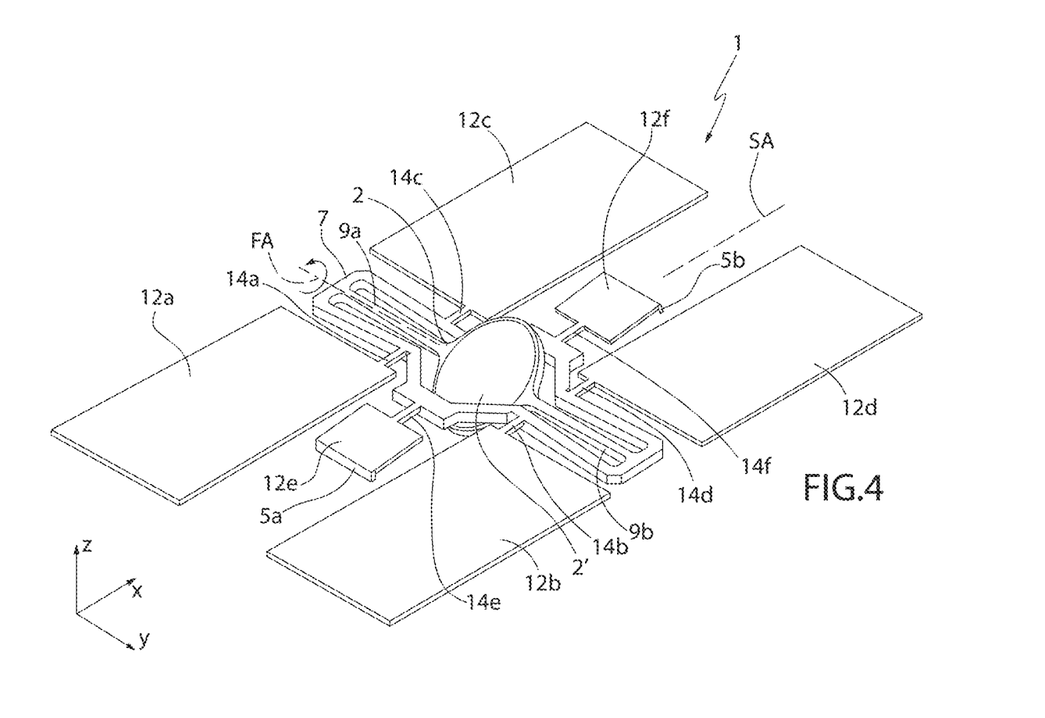

As illustrated in FIG. 4, the application of a biasing voltage to the piezoelectric structure 13 of at least one of the fifth and sixth driving arms 12e, 12f (biasing being in phase opposition in case of actuation of both arms) causes instead a rotation at the resonance frequency of the tiltable structure 2 around the second rotation axis FA.

In detail, the force along the vertical axis z generated by biasing the piezoelectric structures 13 of the aforementioned driving arms 12e, 12f is transmitted through the internal frame 7 to generate the resonant rotation of the tiltable structure 2 around the second rotation axis FA, allowed by the torsional deformation of the coupling elastic elements 9a, 9b.

Instead, the driving arms 12a-12d of the first and second pairs and the corresponding elastic elements 14a-14d are not affected by the aforementioned rotation of the tiltable structure 2 around the second rotation axis FA.

The presence of the internal frame 7 and the described arrangement of the elastic elements therefore advantageously decouple the rotations of the aforementioned tiltable structure 2 around the first and second rotation axes SA, FA.

A further aspect of the present solution is now described, relating to the implementation of detection elements, configured to provide signals indicative of the rotation of the tiltable structure 2 around the first rotation axis SA and around the second rotation axis FA, advantageously in a decoupled manner (i.e., without mutual influences, of a cross-axis type).

Figure 5:
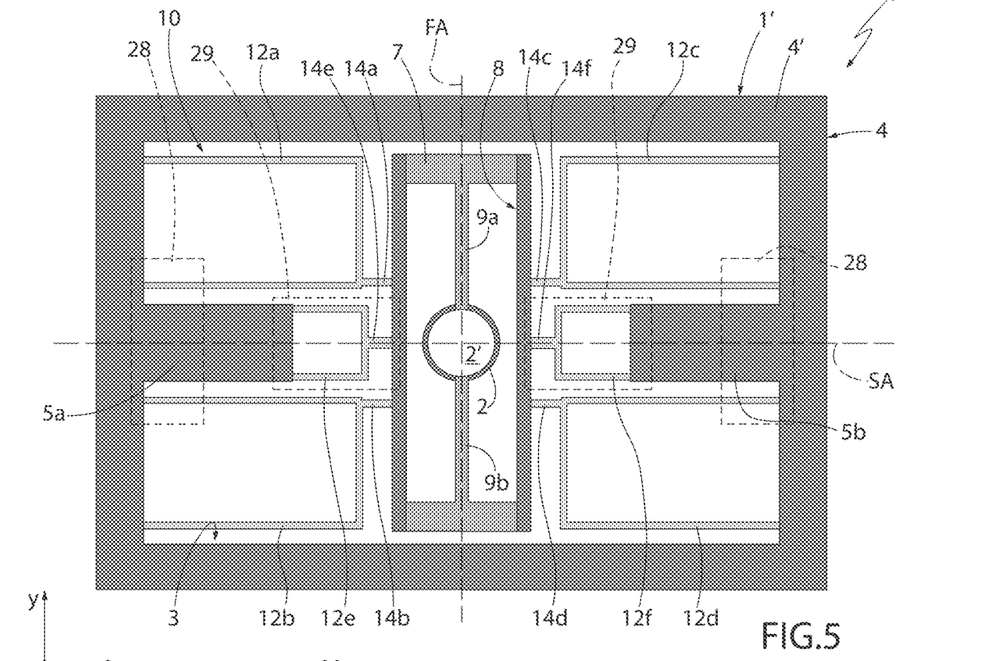
FIG. 5 is a plan view of the device of FIG. 1, where detection structures for detecting rotations of a corresponding tiltable structure are schematically highlighted.

As shown schematically in FIG. 5, first detection elements 28 are suitably coupled to the driving arms 12a-12d of the first and second pairs (for detecting the rotations of the tiltable structure 2 around the first rotation axis SA, without being affected by the rotation around the second rotation axis FA); and second detection elements 29 are suitably coupled to the driving arms of the third pair 12e-12f (for detecting the rotations of the tiltable structure 2 around the second rotation axis FA, without being affected by the rotation around the first axis SA).

Figure 6A:
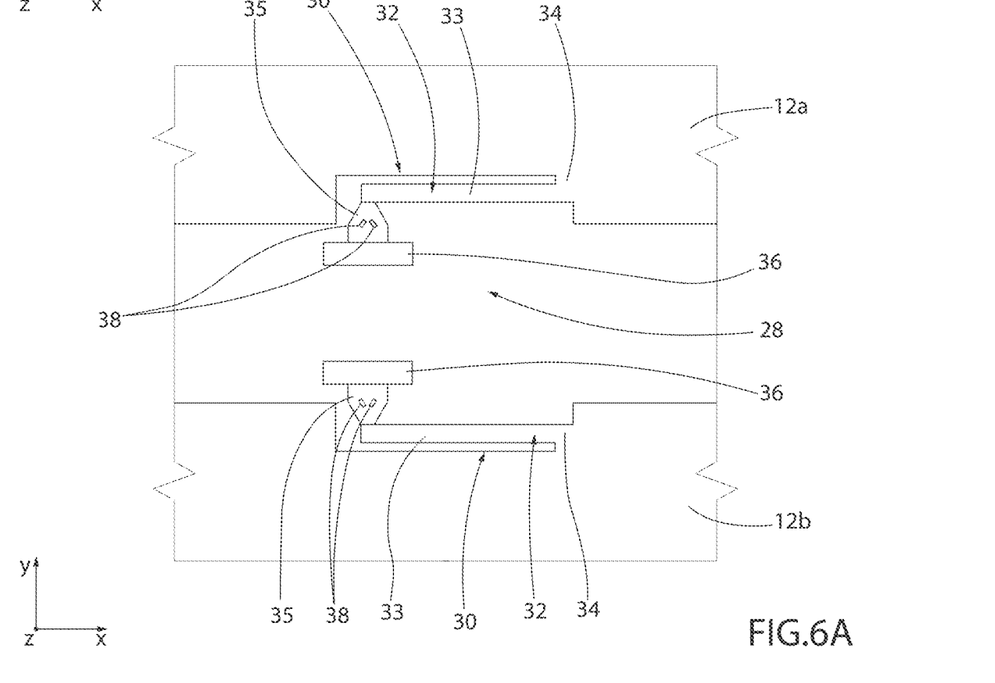
FIGS. 6A, 6B are more detailed plan views of the detection structures of FIG. 5.
Figure 6B:
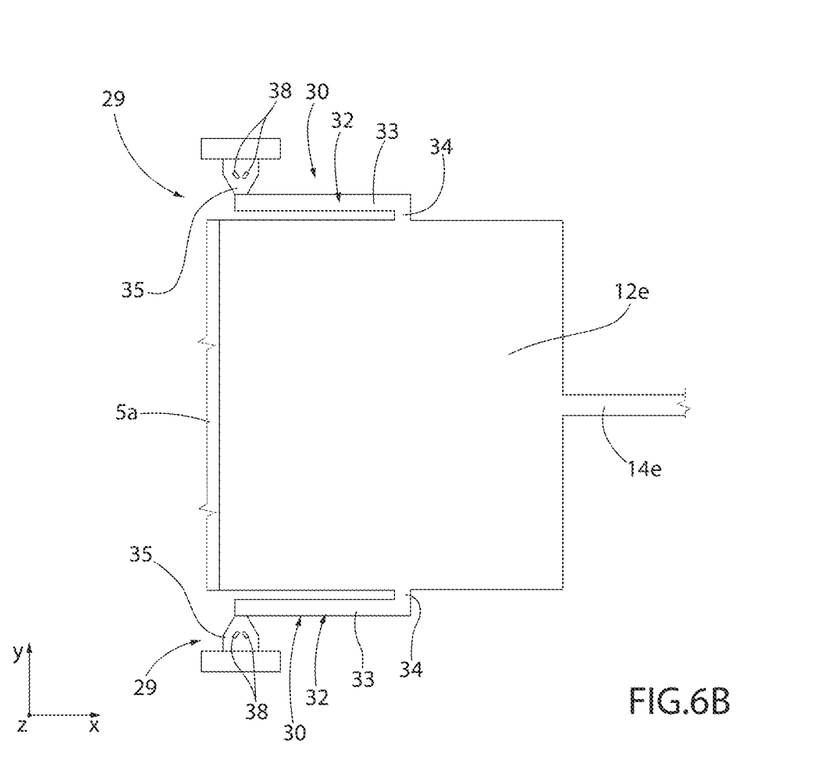

In particular, with reference also to FIGS. 6A and 6B (which illustrate, by way of example, first detection elements 28 associated with the first and second driving arms 12a, 12b and, respectively, second detection elements 29 associated with the fifth driving arm 12e), at least one mechanical amplification structure 30, configured to maximize the detection sensitivity to the rotations of the tiltable structure 2, is coupled to each of the driving arms 12a-12f.

Note that in the embodiment illustrated in FIG. 6B, two mechanical amplification structures 30, arranged on the opposite side with respect to the first detection axis SA, are coupled to the fifth driving arm 12e (and similarly, in a manner not illustrated, to the sixth driving arm 2f).

Each of the aforementioned mechanical amplification structures 30 comprise a lever mechanism 32 coupled to the corresponding driving arm 12a-12f.

In detail, this lever mechanism 32 comprises a lever arm 33 having longitudinal extension (along the first horizontal axis x) and a first end coupled to the corresponding driving arm 12a-12f by a rigid connecting element 34 and a second end coupled, by a torsional elastic element 35 (in the example having an extension along the second horizontal axis y), to an anchoring element 36, integral with the fixed structure 4. In a manner not illustrated in detail, this anchoring element 36 may have for example the aforementioned third thickness $t_3$ and be coupled downwardly to the supporting wafer 24.

The mechanical amplification structure 30 further comprises a pair of diffused piezoresistive sensors (or piezoresistors, PZR) 38 provided in the torsional elastic element 35 in proximity to the aforementioned anchoring element 36.

During operation, the movement along the vertical axis z of the corresponding driving arm 12a-12f (following biasing of the respective piezoelectric material structure 13) determines a movement outside the horizontal plane xy (along the same vertical axis z) of the lever arm 33, in particular of the corresponding first end, consequently generating a torsion of the torsional elastic element 35.

The diffused piezoresistors 38 are arranged in such a way as to detect (with opposite signs) the stress resulting from the aforementioned rotation of the torsional elastic element 35, a stress which is therefore indicative of the rotation of the tiltable structure 2 (caused by the actuation of the corresponding driving arm 12a-12f).

In particular, the presence of the lever mechanism 32 allows amplification of the stress detected by the aforementioned diffused piezoresistors 38.

Figure 7:
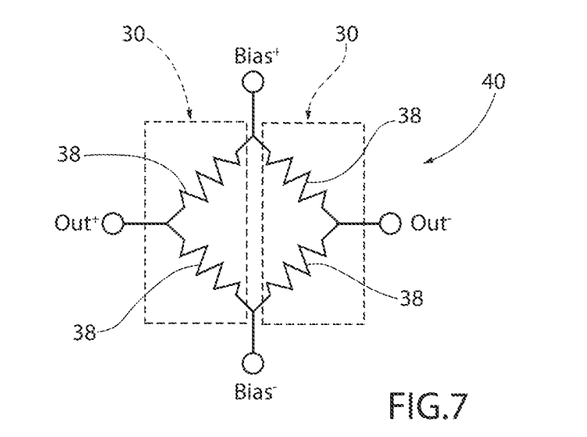
FIG. 7 is an equivalent electric diagram relating to the detection structures of FIG. 5.

As illustrated in the equivalent electric diagram of FIG. 7, the diffused piezoresistors 38 of each mechanical amplification structure 30 may form a first half of a detection Wheatstone bridge, indicated with 40, a second half of which may be formed by the respective diffused piezoresistors 38 of the mechanical amplification structure 30 coupled to the driving arm symmetrically arranged with respect to the first rotation axis SA (in the case of the driving arms 12a-12d of the first and the second pairs) or to the second rotation axis FA (in the case of the driving arms 12a-12d of the third pair).

In particular, the diffused piezoresistors 38 of the first and third driving arms 12a, 12c, and also of the second and fourth driving arms 12b, 12d, are connected to a respective detection Wheatstone bridge 40 for detecting the rotation of the tiltable structure 2 around the first rotation axis SA; similarly, the diffused piezoresistors 38 of the fifth and sixth driving arms 12e, 12f are connected to a respective detection Wheatstone bridge 40 for detecting the rotation of the tiltable structure 2 around the second rotation axis FA.

In detail, in the detection Wheatstone bridge 40, a common end of the diffused piezoresistors 38 associated with a first driving arm of a respective pair is electrically connected to a first output (in the example a positive output) of the same Wheatstone bridge (indicated with 'Out⁺' in the aforementioned FIG. 7); while the ends not in common are electrically connected to a first and second biasing voltages (for example a positive, 'Bias⁺', and a negative 'Bias⁻' biasing voltages). Similarly, a common end of the diffused piezoresistors 38 associated with a second driving arm of the same pair is electrically connected to a second output (in the example a negative output) of the Wheatstone bridge (indicated with 'Out⁻'); while the ends not in common are electrically connected to the same first and second biasing voltages (a positive, 'Bias⁺', and a negative, 'Bias⁻' biasing voltages).

Advantageously, the presence of the two halves, completely symmetrical, of the detection Wheatstone bridge 40 allows the displacements, opposite to each other, of the corresponding lever mechanisms 32 to be detected, thereby making symmetrical the detection and maximizing the resulting detection signal provided at the output. This embodiment therefore advantageously allows the detection sensitivity to be maximized, thus ensuring a more effective control of the microelectromechanical mirror device 1 (for example by an electronic apparatus wherein the same microelectromechanical mirror device 1 is integrated).

As previously indicated, the arrangement of the detection elements 28, 29 and the configuration of the corresponding detection Wheatstone bridges 40 are such that they substantially eliminate the cross-talk effects in the detection of the rotations around the first and second rotation axes SA, FA.

For example, simulations carried out by the Applicant have provided sensitivity values of the first detection elements 28 for the desired rotations around the first detection axis SA equal to 5.5 mV/V/deg, in the face of a sensitivity value in the detection of undesired rotations (due to the cross-talk effect) around the second detection axis FA equal to 0.015 mV/V/deg, therefore of about two orders of magnitude lower.

Figure 8:
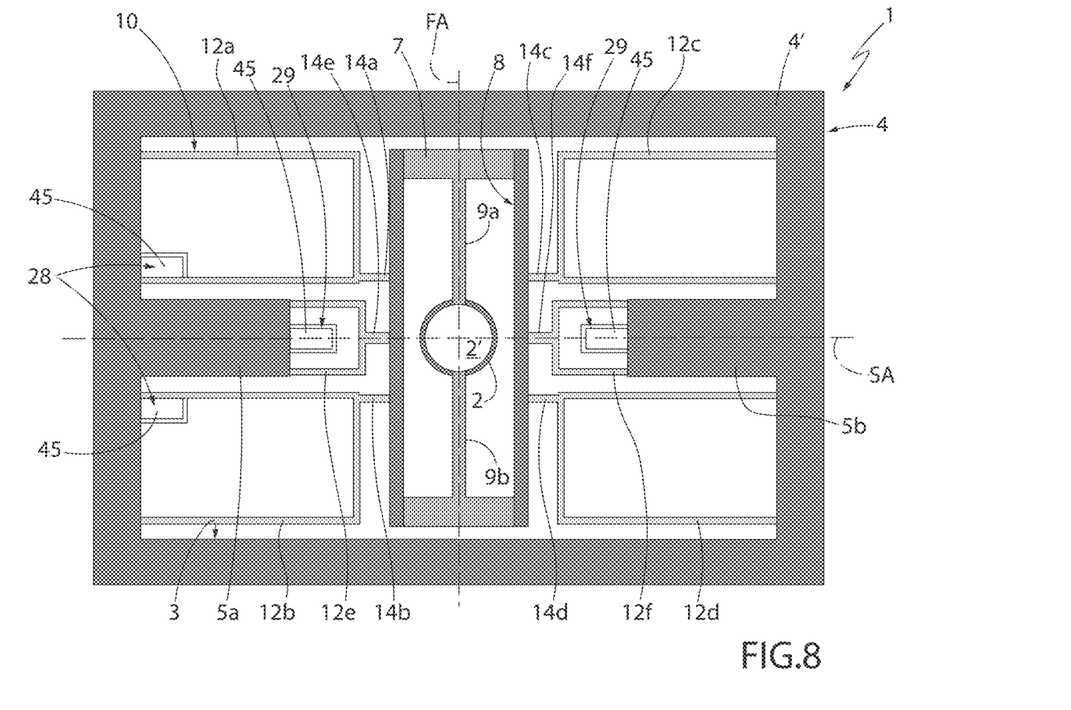
FIG. 8 is a plan view of the device of FIG. 1 with highlighted detection structures, according to a different embodiment.

In an alternative embodiment, as schematically illustrated in FIG. 8, the aforementioned first and second detection elements 28, 29 may comprise, instead of the diffused piezoresistors 38, piezoelectric (in particular PZT) sensors 45 arranged at the driving arms 12a-12f.

These PZT sensors 45 may be formed by respective PZT structures separated from the piezoelectric structures 13 arranged on the same driving arms 12a-12f, for example arranged at the regions of the same driving arms 12a-12f anchored to the fixed structure 4.

In the example shown in FIG. 8, at least a first pair of PZT sensors 45 is arranged at the driving arms 12a-12b of the first pair to detect in a differential manner the rotations of the tiltable structure 2 around the first detection axis SA; and at least a second pair of PZT sensors 45 is arranged at the driving arms 12e-12f of the third pair to detect in a differential manner the rotations of the tiltable structure 2 around the second detection axis FA.

Owing to the good modal separation ensured by the manufacturing of the microelectromechanical mirror device 1 as regards the actuation of the tiltable structure 2, this embodiment also offers a good detection performance, with reduced cross-axis interference.

The advantages of the present solution are clear from the previous description.

In any case, it is again underlined that the described solution allows obtaining of a biaxial microelectromechanical mirror device 1 with compact dimensions and high performances and good electrical characteristics, including in particular a reduced cross-axis interference in the actuation and detection of the rotations of the tiltable structure 2. In particular, the actuation and detection of the rotations of the same tiltable structure 2 are effectively decoupled for the first and the second rotation axes SA, FA.

The processing of the two superimposed top and bottom layers 20a, 20b of the die 1' of semiconductor material (with the associated different thicknesses of the structural elements) allows specific implementation of the rotation movements around the first detection axis SA (for example in a quasi-static mode) and around the second detection axis FA (for example in a resonant mode).

In general, the present solution allows exploitation of the advantages of piezoelectric actuation (i.e., the use of reduced biasing voltages with a reduced energy consumption to obtain high displacements), while having improved mechanical and electrical performances with respect to known solutions.

Figure 9:
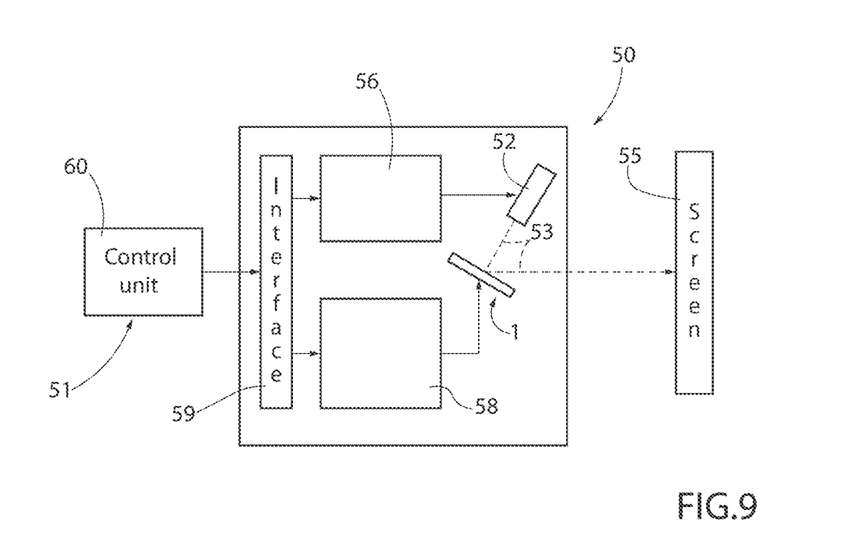
FIG. 9 is a schematic block diagram of a picoprojector electronic apparatus using the microelectronic mirror device.

Advantageously, the microelectromechanical mirror device 1 may therefore be used in a pico-projector 50, being functionally coupled to a portable electronic apparatus 51 (for example a smartphone or augmented reality glasses), as schematically illustrated with reference to FIG. 9.

In detail, the pico-projector 50 comprises: a light source 52, for example of a laser type, for generating a light beam 53; the microelectronic mirror device 1, acting as a mirror and for receiving the light beam 53 and for directing it towards a screen or display surface 55 (external and placed at a distance from the same pico-projector 50); a first driving circuit 56, for providing suitable driving signals to the light source 52, for generation of the light beam 53 as a function of an image to be projected; a second driving circuit 58, for providing driving signals to the actuation structure of the microelectronic mirror device 1; and a communication interface 59 for receiving, from an external control unit 60, for example included in the portable apparatus 51, information about the image to be generated, for example in the form of a pixel matrix. This information is provided as an input for driving the light source 52.

Finally, it is clear that modifications and variations may be made to what has been described and illustrated without thereby departing from the scope of this disclosure.

In general, variants may be foreseen as regards the shape of the elements forming the microelectromechanical mirror device 1, for example different shapes of the tiltable structure 2 (and of the corresponding reflective surface 2'), or different shapes and/or arrangements of the driving arms 12a-12f.

Furthermore, in an evident manner, the aforementioned rotations of the tiltable structure 2 might be combined with each other by a suitable biasing of the piezoelectric structures 13 of the driving arms 12a-12f of the first, second and third pairs in a coordinated and joint manner.

In a variant embodiment, the rotation of the tiltable structure 2 around the first rotation axis SA might also occur at the resonance frequency to generate a fast scan for both the horizontal and vertical directions of the screen or display surface.

The invention claimed is:

1. A device comprising a microelectromechanical mirror device, the microelectromechanical mirror device comprising:
   a fixed structure defining an external frame which internally delimits a cavity;
   an internal frame arranged in the cavity and internally defining a window;
   a tiltable structure carrying a reflective surface having a main extension in a horizontal plane, arranged inside the window and elastically coupled to the internal frame by first and second coupling elastic elements; and
   an actuation structure coupled to the internal frame and configured to cause rotation, in a decoupled manner, of the tiltable structure around a first rotation axis and around a second rotation axis orthogonal to each other and belonging to said horizontal plane;
   wherein said actuation structure comprises:
      at least a first pair of driving arms elastically coupled to the internal frame and carrying respective piezoelectric material regions configured to be biased to cause a rotation of the tiltable structure around said first rotation axis;
      a further pair of driving arms carrying respective piezoelectric material regions configured to be biased to cause a rotation of the tiltable structure around said second rotation axis, the driving arms of said further pair of driving arms extending between an interior perimeter surface of said fixed structure and an exterior perimeter surface of said internal frame to which they are elastically coupled by first and second suspension elastic elements yielding to torsion around the first rotation axis;
      a second pair of driving arms arranged symmetrically to the first pair of driving arms with respect to said second rotation axis; and
      wherein the driving arms of said second pair carry respective piezoelectric material regions and are elastically coupled to the tiltable structure on opposite sides and in proximity to the first rotation axis, by respective elastic elements, yielding to torsion around said first rotation axis.

2. The device according to claim 1, wherein said first and second coupling elastic elements are yielding to torsion around the second rotation axis and have a linear extension along the second rotation axis, on opposite sides with respect to the tiltable structure, from the tiltable structure up to a respective side of the internal frame.

3. The device according to claim 1, wherein said fixed structure comprises first and second supporting elements extending along said first rotation axis inside the cavity from said external frame, on opposite sides of said tiltable structure; and wherein the driving arms of said further pair of driving arms extend between said first and second suspension elastic elements and, respectively, said first and second supporting elements.

4. The device according to claim 1, wherein said first and second suspension elastic elements have a first thickness along a vertical axis orthogonal to said horizontal plane; and wherein said first and second coupling elastic elements have a second thickness, along said vertical axis, greater than said first thickness.

5. The device according to claim 4, wherein said fixed structure is provided in a die of semiconductor material comprising an upper layer and a bottom layer of semiconductor material, superimposed on each other; and wherein said first thickness is defined by said upper layer and said second thickness is defined by said bottom layer.

6. The device according to claim 4, wherein said first thickness is comprised between 10 μm and 50 μm; and wherein said second thickness is comprised between 50 μm and 200 μm.

7. The device according to claim 4, wherein the driving arms of said first pair of driving arms are elastically coupled to said internal frame through first and second elastic elements extending parallel to, and on opposite sides of, said first rotation axis and yielding with respect to torsion around a rotation axis parallel to said first rotation axis; and wherein the driving arms of said first pair of driving arms, the driving arms of said further pair of driving arms and said first and second elastic elements have said first thickness.

8. The device according to claim 4, wherein said internal frame has short sides coupled to said tiltable structure through said first and second coupling elastic elements and long sides coupled to said driving arms of said further pair of driving arms through said first and second suspension elastic elements; and wherein said external frame, said tiltable structure and said long sides of the internal frame have a third thickness equal to a sum of said first thickness and second thickness and said short sides of the internal frame have said second thickness.

9. The device according to claim 1, wherein said tiltable structure is configured to rotate around said first rotation axis with a quasi-static movement and to rotate around said second rotation axis with a resonant movement.

10. The device according to claim 1, further comprising first and second detection elements configured to provide detection signals indicative of the rotation of the tiltable structure around the first rotation axis and, respectively, around the second rotation axis, in a decoupled manner; wherein said first detection elements are coupled to the driving arms of the first pair of driving arms for detecting the rotations of the tiltable structure around the first rotation axis and said second detection elements are coupled to the driving arms of the further pair of driving arms for detecting the rotations of the tiltable structure around the second rotation axis.

11. The device according to claim 10, wherein said first and second detection elements comprise respective diffused piezoresistors, arranged at the respective driving arms.

12. The device according to claim 10, wherein said first and second detection elements comprise respective piezoelectric sensors, arranged at the respective driving arms.

13. The device according to claim 10, wherein each of said first and second detection elements comprises a respective mechanical amplification structure, having a lever mechanism, coupled to a corresponding driving arm; and wherein said lever mechanism comprises a lever arm having longitudinal extension and a first end coupled to a corresponding driving arm by a rigid connecting element and a second end coupled, by a torsional elastic element to an anchoring element, integral with the fixed structure, with a pair of diffused piezoresistors being provided in the torsional elastic element in proximity to said anchoring element.

14. The device according to claim 13, wherein the diffused piezoresistors of each mechanical amplification structure form a first half of a detection Wheatstone bridge, a second half of which is formed by the respective diffused piezoresistors of the mechanical amplification structure coupled to the driving arm arranged symmetrically with respect to the first rotation axis, or to the second rotation axis.

15. The device of claim 1, wherein the device comprises a pico-projector apparatus including:
the microelectromechanical mirror device;
a light source configured to generate a light beam that impinges upon the microelectromechanical mirror device;
a first driving circuit configured to provide first driving signals to the light source to cause the generation of the light beam by the light source as a function of an image to be projected; and
a second driving circuit configured to provide second driving signals to the microelectromechanical mirror device to cause movement of the microelectromechanical mirror device to thereby scan the light beam in a scanning pattern.

16. A microelectromechanical mirror device, comprising:
a fixed structure defining an external frame which internally delimits a cavity;
an internal frame, arranged in the cavity and internally defining a window;
a tiltable structure carrying a reflective surface having a main extension in a horizontal plane, arranged inside the window and elastically coupled to the internal frame; and
an actuation structure, coupled to an internal frame and configured to cause rotation of the tiltable structure;
wherein said actuation structure comprises:
a first pair of driving arms elastically coupled to the internal frame and carrying respective piezoelectric material regions; and
a further pair of driving arms carrying respective piezoelectric material regions, the driving arms of said further pair of driving arms extending between an interior perimeter surface of said fixed structure and an exterior perimeter surface of said internal frame, to which they are elastically coupled by first and second suspension elastic elements;
a second pair of driving arms arranged symmetrically to the first pair of driving arms; and
wherein said driving arms of said second pair of driving arms carry respective piezoelectric material regions and are elastically coupled to the tiltable structure on opposite sides, by respective elastic elements, yielding to torsion.

17. The device according to claim 16, wherein said first and second suspension elastic elements have a first thickness along a vertical axis orthogonal to said horizontal plane; and wherein said first and second coupling elastic elements have a second thickness, along said vertical axis, greater than said first thickness.

18. The device according to claim 16, wherein said fixed structure is provided in a die of semiconductor material comprising an upper layer and a bottom layer of semiconductor material, superimposed on each other; and wherein said first thickness is defined by said upper layer and said second thickness is defined by said bottom layer.

19. The device according to claim 16, wherein the driving arms of said first pair of driving arms are elastically coupled to said internal frame through first and second elastic elements extending parallel to, and on opposite sides of, a first rotation axis; and wherein the driving arms of said first pair of driving arms, the driving arms of said further pair of driving arms and said first and second elastic elements have said first thickness.

20. The device according to claim 16, wherein said internal frame has short sides coupled to said tiltable structure through said first and second coupling elastic elements and long sides coupled to said driving arms of said further pair through said first and second suspension elastic elements; and wherein said external frame, said tiltable structure and said long sides of the internal frame have a third thickness equal to a sum of said first thickness and second thickness and said short sides of the internal frame have said second thickness.

* * * * *